(12) United States Patent
Alexander et al.

(10) Patent No.: US 8,332,482 B2
(45) Date of Patent: *Dec. 11, 2012

(54) MEDIA ADVERTISING OVER PEER-TO-PEER NETWORKS

(75) Inventors: Justin Alexander, Bet Hakerim (IL); Rob Schweitzer, Maitland, FL (US)

(73) Assignee: David S. Morganstein, West Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,805

(22) Filed: Nov. 29, 2011

(65) Prior Publication Data

US 2012/0246002 A1 Sep. 27, 2012

Related U.S. Application Data

(63) Continuation of application No. 10/639,731, filed on Aug. 12, 2003, now Pat. No. 8,090,798.

(60) Provisional application No. 60/402,551, filed on Aug. 12, 2002.

(51) Int. Cl.
*G06F 15/16* (2006.01)

(52) U.S. Cl. ............... 709/217; 705/14.4; 705/14.49; 705/14.51; 705/14.73

(58) Field of Classification Search ............ 709/217; 705/14.4, 14.49, 14.51, 14.73
See application file for complete search history.

(56) References Cited

U.S. PATENT DOCUMENTS

| | | | |
|---|---|---|---|
| 6,195,680 B1 | 2/2001 | Goldszmidt et al. |
| 6,314,451 B1 | 11/2001 | Landsman et al. |
| 6,321,252 B1 | 11/2001 | Bhola et al. |
| 6,526,275 B1 | 2/2003 | Calvert |
| 6,895,430 B1 | 5/2005 | Schneider |
| 7,263,560 B2 | 8/2007 | Abdelaziz et al. |
| 2001/0037304 A1 | 11/2001 | Paiz |
| 2002/0007350 A1 | 1/2002 | Yen |
| 2002/0073075 A1 | 6/2002 | Dutta et al. |
| 2002/0161739 A1 | 10/2002 | Oh |
| 2003/0050966 A1 | 3/2003 | Dutta et al. |
| 2003/0097299 A1 | 5/2003 | O'Kane et al. |

(Continued)

OTHER PUBLICATIONS

Business Wire, Feb 15, 2005 "INTENT MediaWorks Releases First P2P Software to Prevent Illegal File Trading" http://findarticles.com/p/articles/mi_m0EIN/is_2005_Feb_15/ai_n9529886/ pp. 1-3.

(Continued)

*Primary Examiner* — Glenton B Burgess
*Assistant Examiner* — Oleg Survillo
(74) *Attorney, Agent, or Firm* — Patents on Demand P.A.; Brian K. Buccheit

(57) ABSTRACT

Advertising on P2P networks can include a three-step system in one embodiment of the disclosure. The first step can include the review of search requests, followed by a response linking to a media file containing an advertisement. The second step can be a delivery process. The advertising cannot be considered spam as the user can be redirected towards information that can directly correlate to the users search. The advertising can be done with the full cooperation and volition of the media company or companies involved. The advertisers' contract with the media companies can allow for payment and the media companies can then expose their product to potential buyers. The third step can be contacting an advertising server any time that media file is played. In this third step it can be determined what the optimal advertisement for this media file is.

17 Claims, 11 Drawing Sheets

U.S. PATENT DOCUMENTS

| | | | |
|---|---|---|---|
| 2003/0191828 A1 | 10/2003 | Ramanathan et al. | |
| 2003/0195852 A1 | 10/2003 | Campbell et al. | |
| 2003/0212710 A1 | 11/2003 | Guy | |
| 2003/0221009 A1 | 11/2003 | Standridge et al. | |
| 2004/0034601 A1 | 2/2004 | Kreuzer | |
| 2004/0039707 A9 | 2/2004 | Ricci | |
| 2005/0038716 A1 | 2/2005 | Eagle et al. | |
| 2006/0136577 A1 | 6/2006 | Stern et al. | |
| 2006/0229904 A1 | 10/2006 | Hunter et al. | |
| 2007/0061203 A1 | 3/2007 | Ellis et al. | |
| 2007/0097885 A1 | 5/2007 | Traversat et al. | |
| 2011/0302257 A1* | 12/2011 | Asher | 709/206 |

OTHER PUBLICATIONS

By Catherine Holahan, News Analysis Feb. 26, 2007, "Advertising to the File-Sharing Crowd" http://www.businessweek.com/print/technology/content/feb2007/tc2007 pp. 1-3.

"INTENT MediaWorks Previews New "myPeer" P2P Software" by INTENT MediaWorks / Andy Cooper; Nov. 30, 2005 http://www.Free-Press-Release.com/.

"INTENT MediaWorks Briefs White House on Commercial Uses of P2P" Atlanta, GA—Mar. 16, 2005 http://www.creativeblaze.com/demos/intentMedia/press_pr_031605.html; pp. 1-2.

"The Future of Peer-to-Peer (P2P) Technology" Competition, Foreign Commerce, and Infrastructure Hearing Wednesday, Jun. 23, 2004—2:30 PM—SR -253 by: Les Ottolenghi: pp. 1-13.

"Peer-to-Peer Advertising" by David Radd; Bloomberg BusinessWeek; Monday Apr. 26, 2010; pp. 1-2 http://www.businessweek.com/innovate/content/jan2007/id20070103_060734.htm.

\* cited by examiner

MEDIA ADVERTISING OVER PEER-TO-PEER NETWORKS

CROSS-REFERENCE TO RELATED APPLICATIONS

Pursuant to 35 USC §120, this continuation application claims priority to and benefit of U.S. patent application Ser. No. 10/639,731, entitled "SYSTEM AND METHODS FOR DIRECT TARGETED MEDIA ADVERTISING OVER PEER-TO-PEER NETWORKS", filed on Aug. 12, 2003, now U.S. Pat. No. 8,090,798 the disclosure of which is incorporated herein in its entirety for all purposes, and which is based on provisional patent application No. 60/402,551, filed on Aug. 12, 2002, which is hereby incorporated by reference in its entirety.

BACKGROUND

The disclosure relates to the field of information technologies, and to media advertising over Peer-to-Peer (P2P) file sharing networks.

The pace of technological innovation with regard to P2P networking technology and the Internet is outpacing the capability of present intellectual property laws to regulate it. The days of easy regulation and the use of litigation as a tool for controlling intellectual property are numbered. Today, many copyrighted works such as music can be converted to a digital format and distributed over the Internet. It is very difficult for intellectual property owners to pursue even a small fraction of the existing potential copyright infringement cases. Intellectual Property owners and management companies have to adapt or will find themselves in an endless conflict with emerging technologies. There is a need for direct targeted media advertising utilizing the systems and methodologies.

Currently, advertising is not effective in many modem P2P networks, and it is often prohibited or severely restricted. Currently, P2P networks and companies are seen by many as means for users to get free content and to benefit from copyright infringement. Media companies and content providers gain nothing and suffer losses as users of P2P networks obtain for free what consumers would otherwise have to buy.

BRIEF SUMMARY

Embodiments of the disclosure provide a system and methods for targeted media advertising over P2P file sharing networks. Embodiment of the disclosure also provide for targeting exact consumer market classification for delivery of tailored product sets.

Embodiments of the disclosure, and all of its related components, are designed to adapt to the particular behaviors of the P2P network to which it is connected. Communication is provided by available networks, via Ethernet, token ring, token bus, modem, or other hierarchical Local Area Networks (LAN) and/or Wide Area Networks (WAN) configuration.

In accordance with varying aspects of the disclosure, the controlling logic provides for a particular sequence of execution. The controlling logic can be described as a process that includes attaching to a designated network, gathering necessary information on network for continued use, replicating the behavior of a client/server on the P2P network, scanning for file search requests, and responding to file search requests with media files with advertisements. The process further includes analyzing requests made by the consumer's machine, allowing the consumer to play the found media file, and finally responding with an advertisement to be played before media presentation of the found file to the user.

In one embodiment, the disclosure provides a system designed to expedite advertising on P2P networks. This can be accomplished by a three-step system. The first step can include the review of search requests, followed by a response linking to a media file containing an advertisement. The second step can be a delivery process. The advertising cannot be considered spam as the user can be redirected towards information that can directly correlate to the users search. The advertising can be done with the full cooperation and volition of the media company or companies involved. The advertisers' contract with the media companies can allow for payment and the media companies can then expose their product to potential buyers. The third step can be contacting an advertising server any time that media file is played. In this third step it can be determined what the optimal advertisement for this media file is.

In another embodiment, when the system of the disclosure is activated, it connects to the P2P network in a manner similar to any other client/server application. The system then begins probing network traffic for file search requests. Upon discovering the file search request, the system responds with a custom media file designed to contact the system when played. The custom media file can contain a copy of the selected file with an embedded request for information (e.g., a hyperlink) for presentation to the person from whom the search request was received. The request for information can reference an advertising server containing advertisements to be displayed with the provided media file. When the user runs the downloaded content file the content file sends a request for service to a site (e.g., a reflector server) that responds by serving information such as advertising to the requester.

These advertisements can, for example, take the form of pop-up advertisements. Furthermore, the ads, while involuntary, are targeted to the characteristics of the afore-mentioned media file, therefore reducing the receivers' resistance toward the advertisement. Therefore, embodiments of the disclosure can provide methods of advertising on a P2P network in a manner beneficial to both media companies and users.

The above process provides a user with a symbiotic way deriving profit from P2P file sharing, which is currently costing them billions in revenue every year. This is a way of advertising on P2P file sharing networks without fear of retaliation by hackers or consumer backlash. The systems and methodology of embodiments of the disclosure also allow businesses or individuals to limit the proliferation of unauthorized copies of their media by making legitimate copies of copyrighted material more common on P2P networks than pirated materials. Since embodiments of the disclosure are more efficient than regular P2P clients, it is capable of saturating the return search client with legitimate materials containing advertisements.

DETAILED DESCRIPTION

Figure 1A:
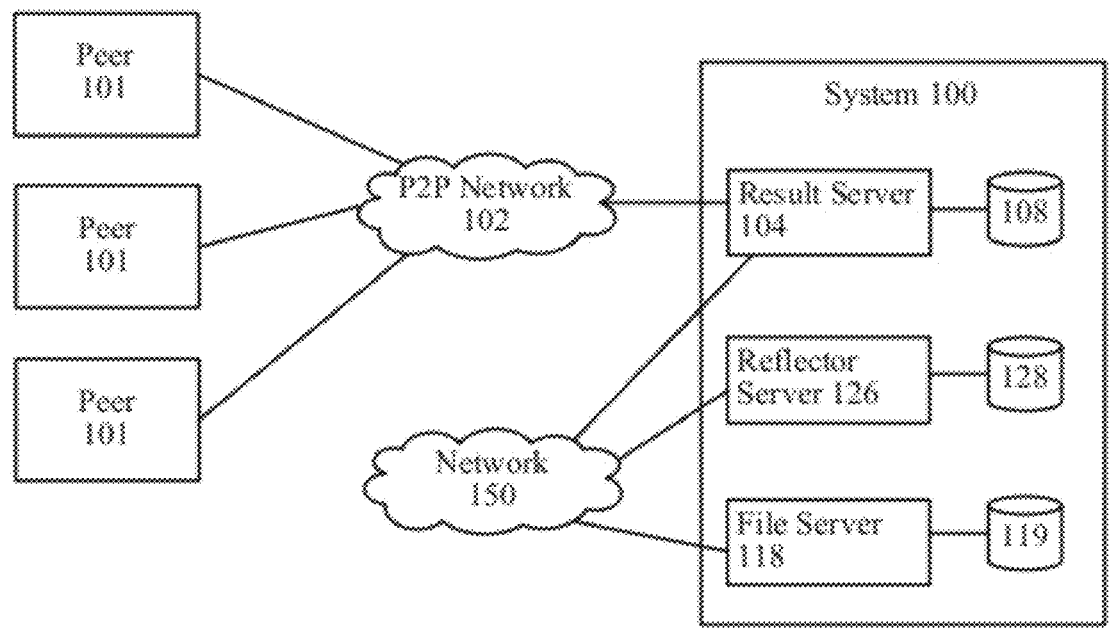
FIG. 1A is a block diagram depicting one embodiment of a peer-to-peer content file distribution system in accordance with embodiments of the inventive arrangements disclosed herein.
Figure 1B:
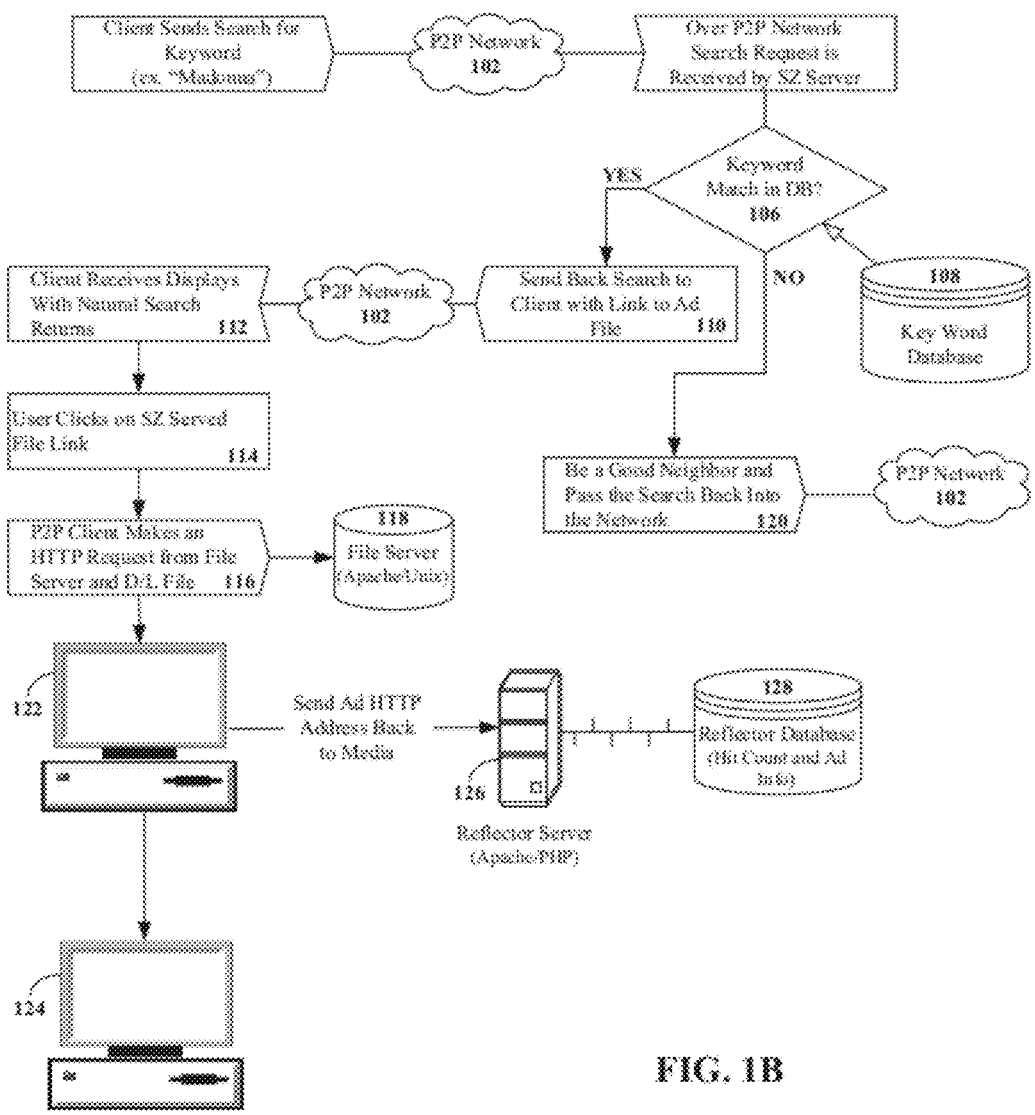
FIG. 1B illustrates a full event overview of one embodiment of the entire peer-to-peer content file distribution system in accordance with embodiments of the inventive arrangements disclosed herein.

We discuss an embodiment of the disclosure that presents a new alternative to the media companies: to profit from the proliferation of P2P networks by the use of a technology which allows for direct, targeted advertising that P2P file-sharing communities are likely to accept. In one embodiment, it is notable that P2P file sharing can be a data exchange infrastructure that allows the exchange of information between two or more computers without a central network layout structure. This means that every machine connected to the P2P network contains client and server capability to both request information from and serve information to other machines of similar configuration. Such networks are organized loosely without any centralized management authority.

The invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

In embodiments detailed herein, P2P users are directed to information that directly correlates with their interests. Thus, a P2P user comes in contact with music, media files (i.e., content), and other products of which they may not have known before. These products are directly correlated to the interests of the P2P user. The system described allows media companies that wish to profit from the market available on P2P networks to review user searches and to direct those searchers to information they will find interesting. This invention represents the marriage of P2P users' needs with content owners' desires to benefit from this widespread Internet phenomenon.

In one embodiment, direct targeted media advertising utilizing the systems and methodologies contained herein presents a method for intellectual property owners to benefit from the inherent chaos created by P2P networks In essence, this invention allows intellectual property owners of media to "embrace the chaos" and profit from it. That is, currently, P2P networks and companies are seen as a method for users to get free media and to benefit from copyright infringement. Media companies gain nothing and suffer losses as users of the P2P networks obtain for free what they would otherwise have to buy. This invention presents a new alternative to the media companies: to profit and thrive off of the proliferation of P2P networks by the use of a technology which allows for direct targeted advertising that P2P recipients will accept.

More particularly, in embodiments of the disclosure, the system 100 facilitates advertising on P2P networks. In one embodiment, this is accomplished by a three-server system discussed herein. The first step includes the review of search requests, followed by a response linking to a media file containing an advertisement. The second step is a delivery process. The advertising cannot be considered spam as the user is redirected towards information that directly correlates to the user's search. The advertising is done with the full cooperation and volition of the Media Company or companies involved. The content provider's contract with the media companies for payment and the media companies expose their product to hundreds of thousands of potential buyers. The third step is a server that is contacted any time that media file is played. This third server determines what the optimal advertisement for this media file is.

In one embodiment, P2P file sharing is a data exchange infrastructure that allows the exchange of information between two or more computers without a central network layout structure. This means that every machine connected to the P2P network contains client and server capability to both request information from and serve information to other machines of similar configuration. Such networks are organized loosely without any centralized management authority. This allows for any user to attach to the network and share files. It also allows for any user to request shared files from other users having similar characteristics.

It should be understood that the disclosure can be adapted and expanded upon as necessary to perform scaling or bifurcate and separate some of the functionality to increase security, throughput, and the like.

More particularly, the system of the disclosure facilitates advertising on P2P networks. P2P users are directed to information that directly correlates with their interests. Thus, a P2P user comes in contact with music, media files (i.e., content), and other products of which they may not have known before. These products are directly correlated to the interests of the P2P user. The system described allows media companies that wish to profit from the market available on P2P networks to review user searches and to direct those searchers to information they will find interesting. This invention represents the marriage of P2P users' needs with content owners' desires to benefit from this widespread Internet phenomenon.

Any combination of components to achieve this goal in the manner disclosed is contemplated. For example, the following set of figures (FIGS. 1A-10) is intended to illustrate a use case of a particular embodiment of the disclosure. One detailed embodiment of the disclosure, for example, utilizes a set of servers, three servers with different functions, to achieve stronger throughput capacity. In yet another embodiment a server farm can be utilized. It should be understood that not all of the servers discussed in FIGS. 1A-10 are necessary to perform all contemplated and claimed embodiments of the disclosure. In fact, embodiments are contemplated where none of the servers discussed in detail (e.g., the result server 104, the reflector server 126, and the file server 118) are necessary. Instead a single server with the detailed minimal functionality can be utilized, or the detailed minimal functionality of the servers 104, 118, 126 can be performed by one or more peers in a P2P network.

One embodiment of the disclosure is for an information handling system. The system can comprise hardware and computer program instructions that execute upon the hardware, wherein the computer program instructions are stored on a non-transitory storage medium. The system can be configured to act as a node in a peer-to-peer network. The system can serve material to request issuing peers of the peer-to-peer network. The material can be digitally encoded within a content file that contains at least one advertisement. The content file as stored by the system in a non-transitory storage medium can be provided to a requesting client. When any of the copies encoded within a content file is utilized, programmatic code executing upon a machine can be triggered that presents the contained advertisement. The system can comprise at least one physical server that facilitates advertising over the peer-to-peer network.

Embodiments of the disclosure include a method, computer program product, apparatus, and/or computer system comprising an information handling system functioning as a peer in a peer-to-peer network, wherein said peer-to-peer network is organized loosely without any centralized management authority. The information handling system can receiving at least one file search request from a peer-to-peer client of the peer-to-peer network. The information handling system can search a set of files stored in a non-transitory storage medium for a specified file specified within the at least one file search request. Each of the set of files as stored in the non-transitory storage medium can comprise code that causes a presentation of the advertisement when the copy of the at least one file is utilized. Each of the set of files as stored in the non-transitory storage medium comprises an advertisement or a Web link to the advertisement. When a matching file is found, the information handling system can generate a request result comprising a copy of the at least one file. The copy can comprise the advertisement or the Web link to the advertisement. The information handling system can convey the generated request result to the peer-to-peer client over the peer-to-peer network.

Embodiments of the disclosure include a method, computer program product, apparatus, and/or computer system for distributing content files in a peer-to-peer network. In the embodiments, an information handling system can act as a node in a peer-to-peer network, which is further configured to follow rules and protocols of the peer-to-peer network. The peer-to-peer network can be organized loosely without any centralized management authority. The information handling system can receive at least one search request. The search request can comprise search criteria from a peer-to-peer client over the peer-to-peer network. The information handling system can search a database for media files satisfying the search criteria. The information handling system can determine at least one media file satisfying the search criteria. The media file as stored in the database can contain an advertisement or a link to an advertisement not requested by the requesting node. The information handling system can convey the determined media file of the database to the requesting node in the peer-to-peer network over the peer-to-peer network in accordance with the rules and protocols of the peer-to-peer network. Computer usable code of the media file can cause the advertisement to be presented when the media file is utilized.

Embodiments of the disclosure include a method, computer program product, apparatus, and/or computer system for distributing content files in a peer-to-peer network. In these embodiments, an information handling system can receive a search request that was initiated and sent into a peer-to-peer network. The peer-to-peer network can be organized loosely without any centralized management authority. The search request can comprise search criteria from a peer-to-peer client. The received search request can conform to rules and protocols of the peer-to-peer network. The information handling system can search a database for files satisfying the received search criteria. The information handling system can discover at least one file that satisfies the criteria. The at least one file of the database can comprise copyrighted content satisfying the search request. The at least one file of the database can comprise computer usable code that causes an advertisement to be presented when the file is utilized. The information handling system can serve the at least one file of the database over the peer-to-peer network to the peer-to-peer client that issued the search request. The serving of the at least one file by the information handling system can occurs with the full cooperation and volition of a company having legal rights to disseminate the copyrighted material. The method/computer program product/apparatus/computer system can provides a content distributor with a means for deriving profit from peer-to-peer file sharing of copyrighted content.

Referring to FIG. 1A, there is shown a simplified block diagram of a network comprising a system 100 for distributing advertising in a P2P Network 102. The Network 102 comprises a plurality of peers 101 and the system 100 that operates 25 according to embodiments of the disclosure. The system 100 comprises a result server 104 that operates as a well-behaved peer in the P2P Network 102. The results server 104 is coupled to a database 108 that stores key words that correspond to content files that have been modified according to an aspect of the invention to include information in addition to the content corresponding to received search criteria. The result server 104 receives requests for content files just as other peers 101 do. The system 100 can either be connected to or comprise a File Server 118. The File Server 118 controls a database 119 that stores a plurality of content files.

The system 100 can further comprise a Reflector Server 126 for receiving requests for service from peers receiving copies of files stored in the content database 119. The Reflector Server 126 is coupled to a reflector database 128 that stores information such as advertising for serving to peers receiving content files stored in the content database 119.

The File Server 118, Reflector Server 126, and the databases 119 and 128 are shown as connected to a network 150 that may comprise the P2P Network 102. Optionally, only the result server 104 is a peer in the P2P Network 102 and the other servers/databases are other nodes in the network 150.

The above process provides a user such as a content distributor with a means for deriving profit from P2P file sharing the systems and methodology of the present invention also allow businesses or individuals to limit the proliferation of unauthorized copies of their media (content) by making legitimate copies of copyrighted material more common on P2P networks than pirated materials. The system 100 is capable of providing the return search client with legitimate copies of materials containing advertisements.

System 100 is adapted to the particular behaviors of the P2P network to which it is connected. Available networks, via Ethernet, token ring, token bus, modem, or other hierarchical Local Area Networks (LAN) and/or Wide Area Networks (WAN) configuration provide communication.

In accordance with varying aspects of the present invention, the controlling logic provides for a particular sequence of execution. The controlling logic can be described as a process that includes attaching to a designated network, gathering necessary information on network for continued use, replicating the behavior of a client/server on the P2P network, scanning for file search requests, and responding to file search requests with media files with advertisements. The process further includes analyzing requests made by the consumer's machine, allowing the consumer to play the found media file, and finally responding with an advertisement.

When the system 100 of the present invention is activated, it connects to the P2P network 102 in a manner similar to any other peer client/server application. Then, if necessary, depending on the network in question, the system retrieves critical networking information needed to continue operating as part of the P2P network. In a method according to the present invention, the server 104 models the behavior of other peer client/servers 101 on the network 102. This allows the system 100 to secure and retain access to the P2P network 102. The system 100 then begins probing network traffic for file search requests. Upon discovering the file search request, the system 100 responds with a custom media file designed to contact the system 100 when played. When contacted, the system 100 references an internal database 128 containing advertisements to be displayed with this media file. These ads can take the form of pop-up advertisements. The ads, while involuntary, are targeted to the characteristics of the aforementioned media file, therefore reducing the receiver's resistance toward the advertisement. Thus, the present invention provides methods of advertising on a P2P network in a manner beneficial to both media companies and users.

Event Flow—Overall Structure

Implementations of the invention comprise (a) a specific series of events or steps utilizing specific system methodology needed to process each of the events/steps, and (b) the three different server types discussed above. The process begins with the search results server 104, which is a variant/clone on any P2P Client (hereinafter "P2P client"). A P2P client 101 consists of any software that connects to other copies of itself on other computers over a network 102. Once connected, the P2P client 101 exchanges information through the established connections. In a typical P2P network all of the copies of a P2P client/server have equal rights, permissions, and duties on the P2P network. The P2P client/server 101 is so named because P2P-networked computers share data by both serving (server) and receiving (client) files. The search result system mimics the P2P client/server software, thus allowing it to serve advertising over the P2P network.

The Result Server 104 enters into any P2P network (e.g., network 102) and acts as a well-behaved neighbor on that network. A P2P network allows members of the network to use certain files in each other's hard-drives equally. This is in contrast to a server network where one machine (the server) offers access to its files, but the other computer (the client) does not. In this example, the network contains thousands of computers that pass messages to one another, spreading the messages across the network 102. This allows the members 101 to share files with each other. Every computer making requests also shares information on its own computer in a similar fashion. Well-behaved neighbors consist of those members 101 of the network through whom connections to the network are established. Well-behaved neighbors are computers that behave like any other member of the network, or at least seem to behave like any other member, by passing messages when requested.

Just like any other client/server on the network, the Result Server 104 passes along search requests and results. However, with the search result server, every search is compared against its own internal database 108 to see if the incoming search is relevant to files hosted on the system 100. A data search is relevant if it contains information that correlates to keywords in the internal database. The Result Server 104 requests and receives information from the internal database 108 specific to the given search request. An appropriate response to the search request originated by the peer 101 is generated and transmitted back. This return transmission contains a link to a media file located on the system 100 file servers.

If the user clicks on the link to our media file, located on the File Server 118, the user then sends an HTl'P (a standard industry protocol) message back to it. The File Server 118 consists of little more than a web server. This is all that is necessary to transmit files to users according to the invention. Additional operations on the File Server 118 may include error checking for misnamed requests, redirection to less busy file servers, and activity logging.

If the user downloads the media file from the File Server 118, and then plays (runs) the media file, the Reflector Server 126 is contacted. The media file contains instructions to the media player (a program designed to read, and or display a given media type) to "pop-up" a browser window and to display in the media player its contents, the information provided by the online Reflector Server 126. To do this, the pop-up window goes online and contacts the Reflector Server 126. The Reflector Server 126 uses an internal database to identify the media file being played, and locates the appropriate advertisement. Each media file is encoded with a particular Unique ID that it transmits to the Reflector Server during the pop-up phase. The Reflector Server keeps track of the number of hits—the time each ad is requested per Unique ID received through each pop-up.

The internal' database and the search Result Server 104 allow us to direct market/direct target P2P users. For example, someone may be searching for "Madonna" files. The system's technology enables the company to serve links to media files of an artist whose music is similar. The Result Server 104 allows us to serve media files by transmitting a response back to the originator of the search alerting the recipient that we do have a file they would be interested in and it is labeled as "Madonna-like."

The Result Server 104 response comprises the positive results of user file search requests. Results are typically displayed in a top-down list format. Most P2P clients give users the ability to choose different sorting methods for the results. Some of the advanced P2P clients use a tree view where search responses from different locations are placed on a single tree branch. This permits users to look for the fastest download of a particular file across the P2P network. The more times a file is "found," the more times it is listed in the P2P client search response and the greater the chance the user will download the file.

The Result Server 104 acts as both search engine and recommendation engine and allows the searcher to know exactly what they are downloading. This is in exact opposition to the nature of spam, which is untargeted, unsolicited, and indirect advertising which tricks the user into viewing material that the user may not be interested in. The system 100 ensures that anyone who downloads its content knows what he or she is downloading and is interested in the content.

Anyone who downloads search result's content is interested in its content. Unlike with spam, there is no wasted bandwidth. The users are not forced to listen to or see things in which they have no interest.

Embodiments of the current invention improves upon unsolicited advertisements currently in use because it uses targeted solicitation. Targeted solicitation correlates a user's preferences or interests with a particular product being advertised. In contrast, spam uses untargeted solicitation and sends out advertisements to a large, but random, group of individuals without prequalifying their interest based on any other behavior. Untargeted advertising uses more bandwidth because it must send out a huge number of "random ads" to make up for its lack of efficiency. It takes a far greater number of untargeted ads to sell the same amount of product as with 'targeted ads.

Following are examples of spam, untargeted advertising, and unsolicited advertising. The Result Server 104 allows for targeted advertising:

1. Example 1) a user viewing a Madonna™ song gets an ad for Toothpaste popping up on their screen. The ad was neither requested nor targeted towards the recipient. This is spam.
2. Example 2) a user receives an e-mail from an unknown source for Toothpaste. This is spam.
3. Example 3) a user is subscribed to a free music service that makes its money through advertisements, included in the downloads. The user views a Madonna™ video and a Toothpaste ad pops up. This is not spam. This is solicited and untargeted advertising.
4. Example 4) a user downloads a Madonna™ song from a neutral source. The song contains an ad for The Colgate "Sparkling Future" Madonna™ Tour. This is NOT spam. This is unsolicited and targeted advertising over a non-subscription service. This example represents advertising using the system and methods for direct targeted media advertising contained herein.

Improvements on P2P Network File Sharing Efficiency

Efficiency and high performance are required to handle user build-up.
Since tens of thousands of people could potentially be downloading files at the exact same time, efficiency is of the utmost importance. Most P2P clients use the same bandwidth (and usually the same computer) to handle both their P2P connections (used for searches and communication over the P2P network) and their file sharing activities (used to upload and download files). This invention is only concerned with the downloading aspect of client activity. Each of the two activities over the P2P clients' bandwidth limits the other. For instance, the more connections to the P2P network that a P2P client hosts the fewer downloads it can allow, since each action (network connections, and downloads) require a portion of the inherently limited bandwidth.

This limitation is solved by creating a separate server for downloads 20 and connections. In the preferred embodiment P2P network connections are handled by the Result Server 104 and downloads are handled by the File Server 118. The File Server 118 is essentially a web server. The File Server 118 efficiently serves these files concurrently (i.e. at the same time). Moreover, since the downloaded files are generally somewhat large, taking ten or more minutes, concurrent user build-up is inevitable. Every user/browser requesting a file takes a little bit of time from the computer. The more files requested, the more time the action takes to perform.

Every user requires a portion of another entity's bandwidth to download a file. If one user is downloading, then the entity needs the bandwidth equivalent of that user's connection to the Internet (i.e. cable, DSL, modem, etc.). When multiple users are downloading files, then the entity needs the sum of their combined bandwidth. If the users downloading the files exceed the available bandwidth, then every user's download starts to slow and individual connections gradually become more and more unstable resulting in incomplete downloads and broken files. In general, the more bandwidth for serving files the better. In the case of serving files, web servers offer inexpensive bandwidth. This invention allows files to be downloaded from web servers instead of directly from P2P clients. Therefore, this invention allows for use of the cheap bandwidth web servers offer. Web servers can be rented for extremely low rates in an industry standard practice called virtual hosting.

When the user clicks on a hyperlink in the search response, directed to the user from the result server, the user is transparently redirected to a file server, which may be completely independent of the Result Server 104. The whole process is handled automatically, and quickly, so that the user never experiences any service issues from the transition. Everything continues to behave exactly as it would under normal circumstances, and the process is presented in a way that is familiar to the user.

The File Server 118, upon receiving the file request, takes a moment to log the user's IP address (the 32-bit location of a computer on the Internet) and inspects and logs any available information for later demographical studies and statistical analysis. The File Server 118 also checks to see how busy it is with all of its other clients. If the File Server 118 is currently too busy to service the request, it bounces the file request to another server (through redirect) that then begins the file server process all over again.

Playing the Media File & Displaying the Advertisement

Once the user has downloaded a requested file it is assumed that the user will want to play it. The downloaded files are in special formats chosen for their ability to pop-up web browsers when played or to contact the remote Reflector Server. Some formats, such as Windows Media files, Real Media files, and QuickTime video, support pop-up windows whereas other formats, such as MPEG files (media files that send video), do not. Often used for advertising, pop-up web browsers are browser windows that open (are launched automatically) without user intervention. The files are hard-coded (i.e. unchangeable once committed to) to a URL such as www.osideas.com. When the pop-up browser loads this website it also sends a code uniquely identifying the content file that was played. The uniquely identifying code preferably comprises characters (both letters and numbers) that are not repeated among the media files. Based on this information, as well as geographical information based on the user's IP address, we then redirect the popped-up browser to the website of a paying advertiser and keep an accurate log of how many times this has happened so that we know what to charge the advertiser.

The Servers

In one embodiment, the disclosure uses three different types of servers as mentioned above. We now discuss these servers further. Each server has a distinct function and role to play in the complicated process of analyzing searches and transmitting media advertising. The three server types are the Result Server 104, the File Server 118, and the Reflector Server 126. Not all embodiments of the disclosure require these three servers. Further, functionality or any subset of functionality detailed for the servers can be included in embodiments of the disclosure, which are not dependent on the architectural detailed provided herein.

The Result Server

The Result Server 104 represents the first stage of server interaction with the P2P network 102. The Result Server 104 logs onto the P2P network and begins transacting data like any other client/server on the network 102. The Result Server 104 follows the rules and protocol of the respective P2P network to which it connects, allowing it to act as a node in the network 102.

The Result Server 104, however, unlike any other P2P client, does not have any files of its own to share. Instead, it keeps a database of files that are located in or controlled by the File Server 118. It also keeps a record of acronyms for these files. For example, we may be carrying the song of an unknown heavy metal band (e.g., the "Lead Pencils") in our internal database. Let us assume that the unknown heavy metal band sounds just like Metallica™, a popular mainstream band. While Lead Pencils may sound just like Metallica™ and Metallica™ fans would most likely enjoy the opportunity to get to know a band of similar style, Lead Pencils would normally never appear on a search by Metallica™ fans.

Therefore, the result server 104 allows record companies and other media outlets to reach a previously untapped audience by redirecting users to media the user has most likely never been exposed to but will likely enjoy. The Result Server does this by searching out keywords that indicate which products in the internal database the P2P user would most likely be interested in. When the Result Server finds a search request that matches its database of relevant keywords, it does not relay the search onto other P2P clients.

In the example search presented above, the Result Server would look not only for searches for "Lead Pencils," it would also look for keywords like "Metallica™," "Heavy Metal"™, "Enter Sand Man,"™ "Justice for All,"™ and "Lars Ulrich,"™ all keywords indicating a propensity towards the media we wish to advertise for our clients. Since not all of "Lead Pencil's" songs sound like Metallica™ (i.e. some of their songs may sound like "Kenny G™"), only the songs that sound like Metallica™ would have Metallica™ keywords associated with them. The Result Server 104 will also return any Metallica™ media files, which are available.

When the Result Server 104 finds a similarity between the search and 15 any one of a number of entries in the internal database, the Result Server 104 responds by sending a search response that tells the user about the file and where to find it on the File Server. The search result search response is a message sent back by the Result Server 104 in the native tongue of the P2P network that it cooperates with. The process is completely transparent.

In some cases, the Result Server 104 will have the option to respond to the search with multiple hits for the same file. Since each search response that we send back to the user puts one more hit on the user's screen, the better the chance that they will click on one of the search responses. Multiple listings not only provide the opportunity to increase the likelihood that the user will see and click on a file, it informs the searcher that the file exists in more than one place on the file server.

We also can automatically give the user the ability to choose whichever file server is fastest for them on their particular computer system. Many P2P clients 101 will do this for the user automatically.

The File Server

The File Server 118 is essentially just a web server, of any brand or version. It transfers files through any suitable protocol such as HTTP (hyper-text transfer protocol, an industry standard) and keeps track of file transfers. The File Server 118 is coupled to and controls a database 128 that stores media files comprising the content such as a song or movie and additionally stores instructions for the program used to run the media file to request additional information from a site such as the Reflector Server 126.

First, a P2P client 101 initiates a file request. If the server 118 controls 15 the file name, that file is transferred as requested. If the file is not controlled by the system 100, the File Server 118 "guesses" what file name most closely matches the requested file name and returns that specific file. For example, if a user searches for a "Metallica™" file, the File Server 118 might find a similar type of music related to a band called "Lead Pencils." The file name sent to the client is "Lead Pencils sounds like Metallica.wmf."™ If the user selects this file, a request is made to the File Server 118 for a file named "Lead Pencils sounds like Metallica.wmf"™. Since this file name is actually a creation of the Result Server 104 and does not really exist, the File Server 118 must find the closest matching file name that in this case will be "Lead Pencils.wmf." The job of the File Server 118 is to recognize that the requested file is in fact present, but under an assumed name, and to transmit that file to the user under the new name.

The Reflector Servers

Once the user has downloaded the file that user is going to want to play it. When the file itself is played, it launches a web browser directed to a Reflector Server 126. Incorporated into the request to the Reflector Server 126 is the Unique ID of the sought file. This Unique ID is assigned to each media file stored on the File Server 118, but is not changed in-between multiple copies of each file. For instance, each copy of "Lead Pencils—We will Sleep.wmf" will contain the same Unique ID, regardless of what the file is named or how many times it is copied. This way the system 100 will be able to reveal user preferences.

The Reflector Server 126 keeps an accurate record of every pop-up window created, of every media file the pop-up came from, and to whom the pop-up window was sent. The Reflector Server does a quick analysis of the incoming request and redirects the user to the appropriate website, which is not part of the reflector. The Reflector Server identifies the incoming media file by way of the Unique ID included in the web page request made by the content file. Once the Reflector Server determines what the special code/unique ID is, it redirects the user to the website of a paying advertiser appropriate to the entertainment contained in the requested media file.

File Distribution and Distribution Outside of the Proprietary Network

Once a user has downloaded a content file, the user continues to share it with other members of the P2P network via a viral effect. The viral effect refers to a pattern of replication from machine to machine. Each time the advertisement-containing file is transferred (now at the computer owner's request) from one machine to another over the P2P network, the file's rate of reproduction is increased exponentially.

Every downloaded file translates into another server sharing our content files (with ads attached). Therefore, if two people download from us and two people download from each of them and two more from each of them we have spread the file to fourteen people at a cost of only two transactions. Thus, there is a geometric progression of people exposed to the advertisement.

Example of the Viral Effect

Two people download from the system=2.
Two people download from each of the initial two people=4 more.
Two people download from each of the four people who downloaded from the initial two=8 more people.
Total=14 (2+4÷8) people out of only 2 file downloads.

Despite the fact that the File Server 118 and the Result Server 104 may be down for days, the system continues to turn a profit so long as the Reflector Server 126 remains operational. Content files continue to spread across the network even without the system's help because of the viral factor discussed above.

The Result Server 104, however, does play a core role when it is running because its use greatly accelerates the transfer process by being far more efficient at distributing files than the average client/server. For example, the average user with a cable modem connection can only share a maximum of files at any given time. Unlike the average user, the Result Server 104 does not have to spend precious bandwidth on file transfer. A high efficiency file server instead handles bandwidth for file transfer. The high efficiency File Server 118 uses cheap bandwidth that can handle 10,000 downloads or more at one time. The Result Server 104 system therefore allows for many more downloads than conventional file transfer over a P2P network, giving an initial speed boost to transfer efforts and thus distributing the file faster.

Referring to 1B, a client search is initiated 101 and sent into the P2P network cloud 102, made up of similar P2P clients. At some point in the network cloud the Result Server 104 receives the search request. The search term is compared against an internal database of keywords 108 associated with the media located on the File Server 118. If there is a match 106 a search response is sent back to the client who initiated the search 110; otherwise, the packet is passed 120 along back into the network cloud 102. When the client receives the search response 112 it is displayed in a list format particular to their brand of P2P client (clients vary in style and design; however, with some clients, it is possible to identify them from their search request and send back a response best suited to that style of P2P client). If the user clicks 114 on the search response sent back to them from the Result Server 104, they will automatically be directed to make an HTTP request 116 for a file located on the File Server 118. Once downloaded, the media file can be played. The media file preferably contains a pop-up link to the Reflector Server 126. The reflector 126 receives a coded request from the pop-up link (from the media file, from the File Server) and then, based on that unique ID code, identifies the type of media (either of style, format, and or artist) that is making the request and redirects the client's pop-up link to the appropriate advertising located on a remote web server 126. The ad should then be successfully loaded by the client's default web browser like a normal web page 124.

Figure 2:
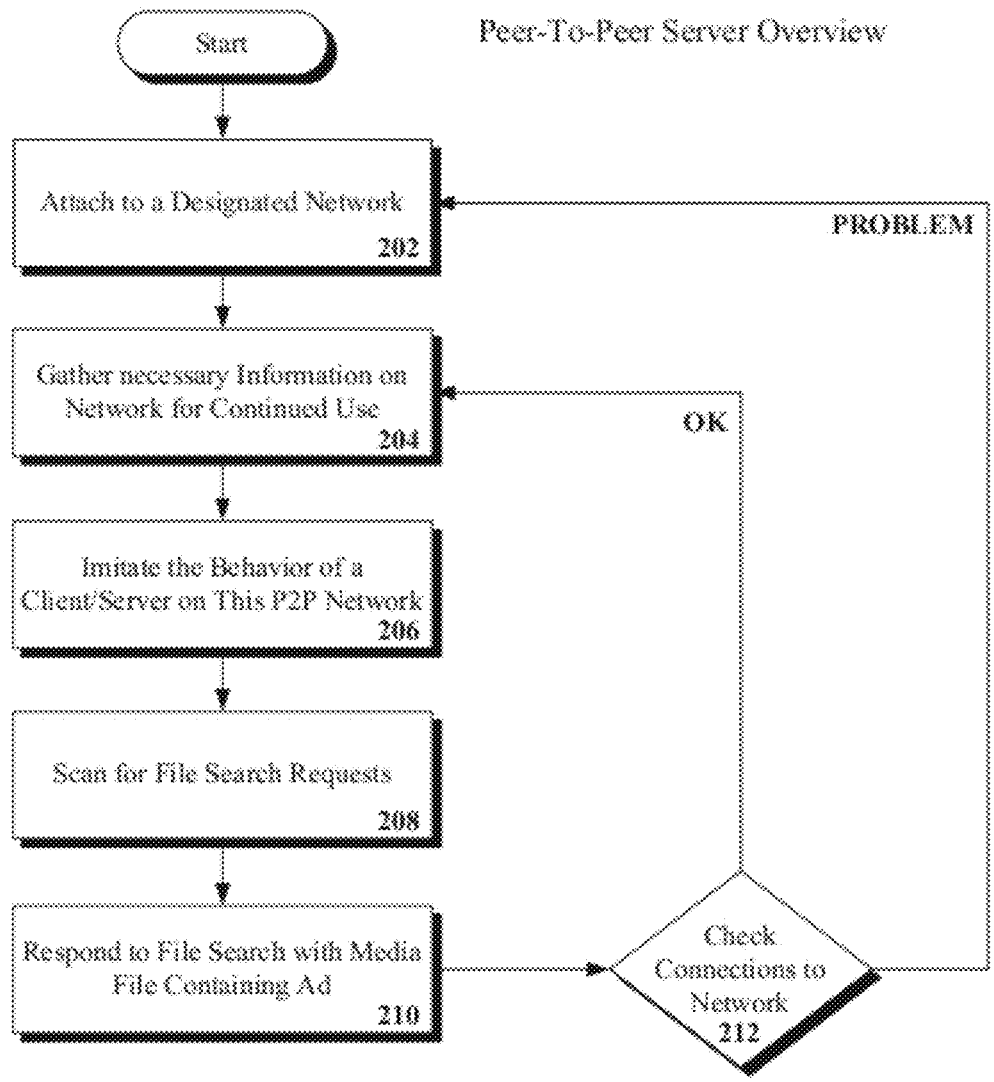
FIG. 2 is a flow chart illustrating an overview of the entire Result Server process in accordance with embodiments of the inventive arrangements disclosed herein.

Referring to FIG. 2, there is shown a flow chart illustrating a method 200 for the Result Server 104 attaching to a designated network. In order to begin receiving search packets over the P2P network, in step 202, the Result Server 104 must first connect to a P2P network (detailed in FIG. 3). To operate on this network, in step 204, the Result Server 104 gathers information about the current state of this P2P network (detailed FIG. 5). In order to retain access to this network, in step 206, the Result Server 104 must replicate the behavior of the P2P network (detailed in FIG. 6). Then in step 208 the Result Server 104 scans for file search requests that match the keywords database 108 (detailed in FIG. 7). If a search request does match something in the keyword database 108, then in step 210, the Result Server 104 responds with a link to media (content) contained on the File Server 118 (detailed in FIG. 8). In decision 212 the Result Server 104 also checks connections to the P2P network for slow response times, error prone behavior, or hostility (detailed in FIG. 4). If everything is all right, the Result Server 104 returns to step 204 and continues with normal operations; if not, it terminates this connection and gets a new one in step 202.

Figure 3:
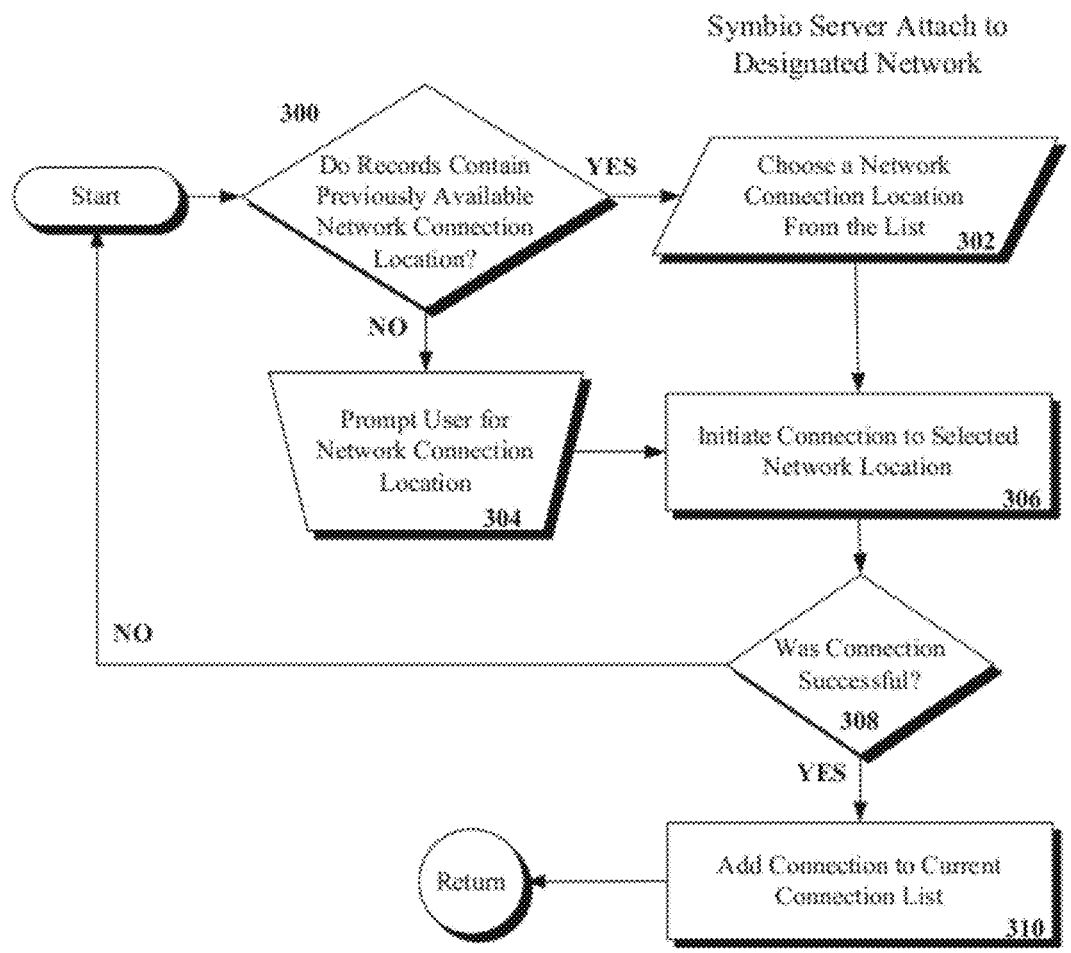
FIG. 3 is a flow chart illustrating how in one embodiment the Result Server attaches to the P2P client/server network in accordance with embodiments of the inventive arrangements disclosed herein.

FIG. 3 depicts a connection command flow. In order for the Result Server 104 to connect the user to a P2P network, it must first know the address of at least one existing member of the P2P network. This address can be represented either by a domain name or, more commonly, a TCP/IP address and port. Thus in decision 300 the Result Server 104 determines whether the records contain previously available network connection information. If the Result Server 104 does have a preexisting list of TCP/IP addresses, in step 302 the Result Server 104 will choose a network connection location from the list and in step 306 will initiate a connection to the selected network location. If the Result Server 104 does not have a preexisting list of TCP/IP addresses (decision 300) (either from a previous run of the result server, or a list that comes packaged with the installation files), in step 304 it will prompt the user to enter an initial network address for the Result Server 104 to connect to. In decision 308, the Result Server 104 then determines whether the connection was successful. If the connection succeeds, in step 310 the Result Server 104 continues as illustrated, adding the connection to the current connection list. If, however, the connection fails, the Result Server 104 will return to the list of addresses and attempt to connect to the next address on the list. If there are no more addresses listed, the Result Server 104 will then prompt the user for a new address.

Figure 4:
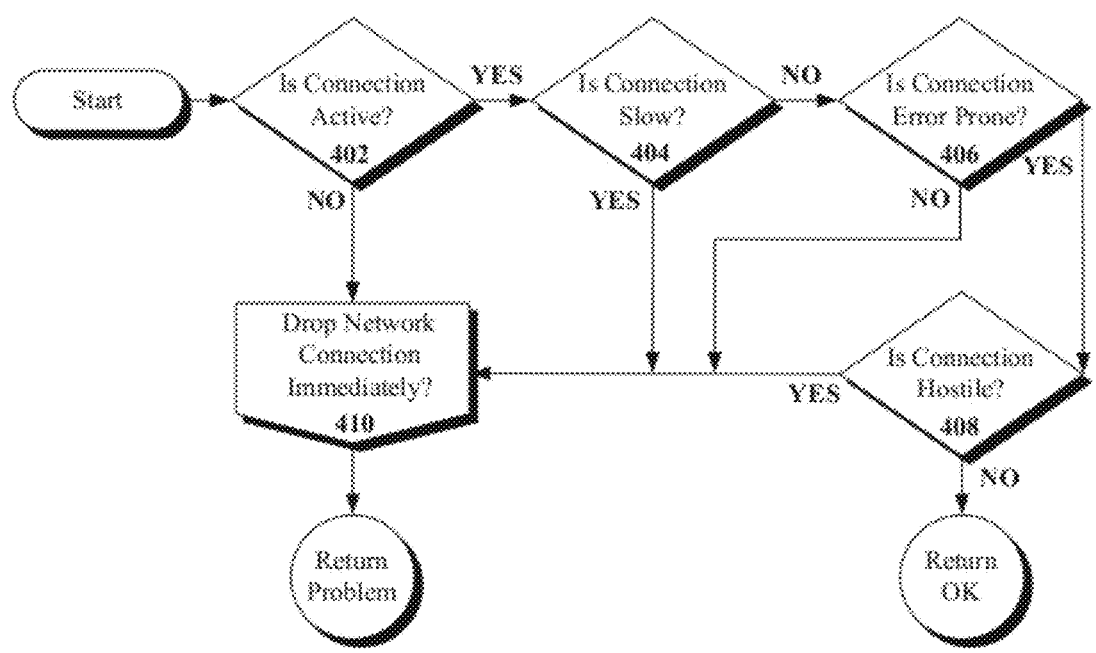
FIG. 4 is a flow chart illustrating how in one embodiment the Result Server scans for and detects delinquent or hostile connections in accordance with embodiments of the inventive arrangements disclosed herein.

FIG. 4 depicts how the Result Server 104 checks the neighbor connections for any signs of weakness or hostility. The program first determines if the connection is active (decision 402). If the connection is not active, running too slow for practical use (decision 404), or is prone to dropping 25% or more of the packets sent to it (decision 406), or if the connection shows advanced advertising detection features (decision 408), then the connection is terminated (decision 410) and the Result Server 104 then forms a new connection into the P2P network in the same fashion it connected in FIG. 3. If everything is all right, the Result Server 104 continues with normal operations.

Figure 5:
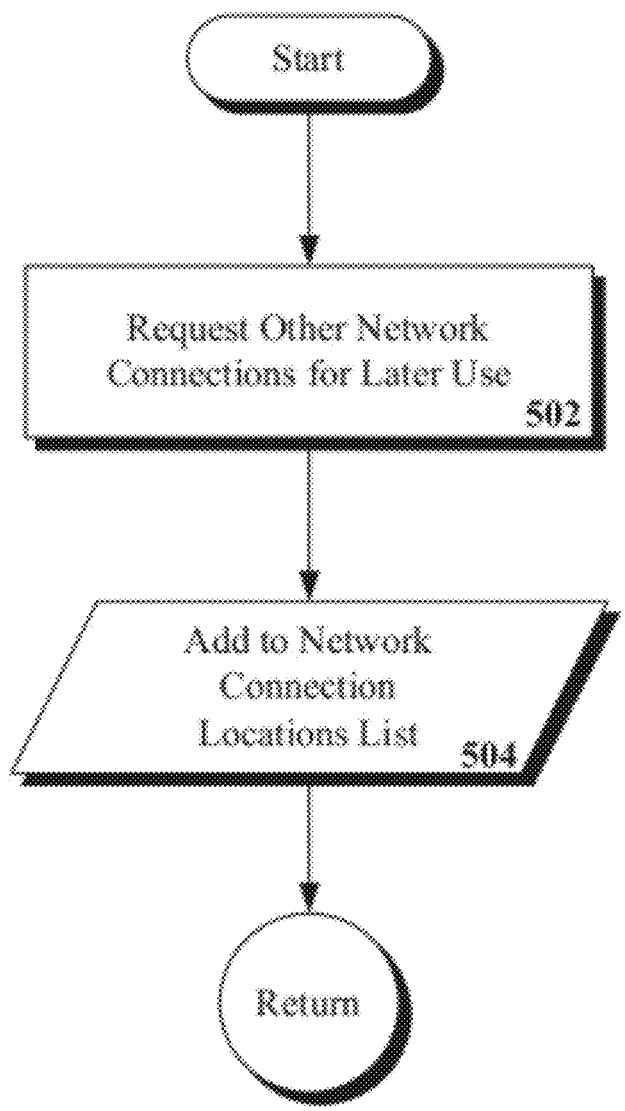
FIG. 5 is a flow chart illustrating how in one embodiment the Result Server gathers operating information on its host network in accordance with embodiments of the inventive arrangements disclosed herein.
Figure 6:
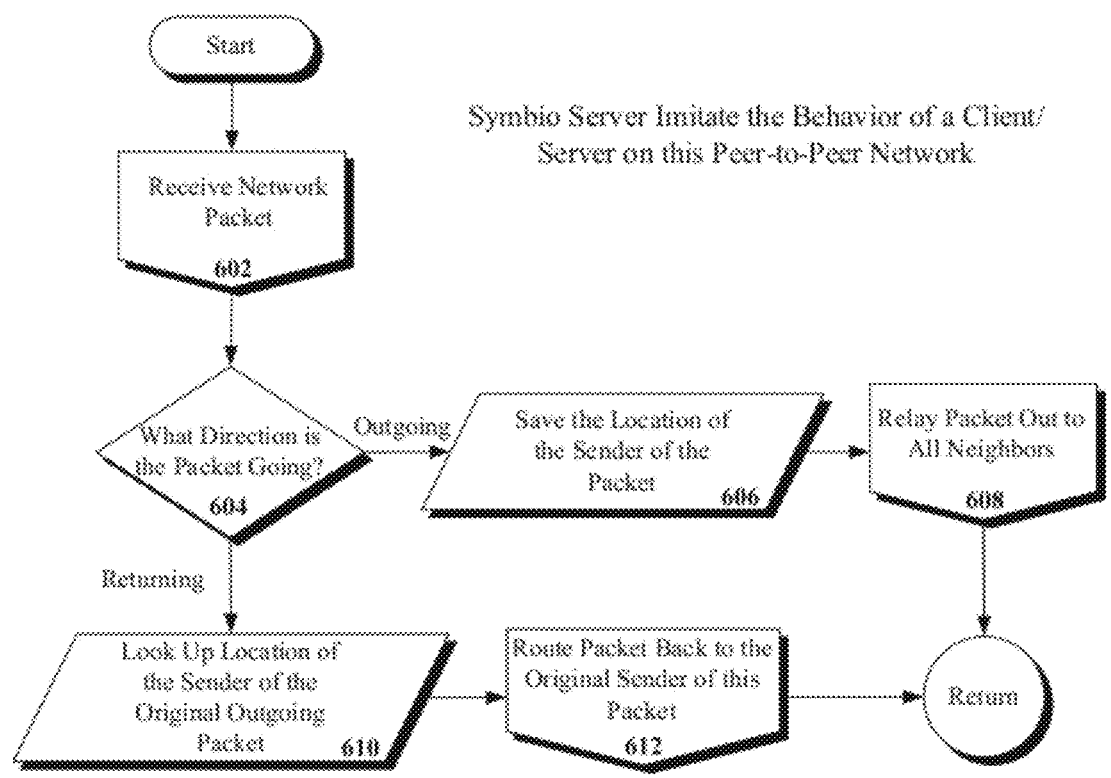
FIG. 6 is a flow chart illustrating how in one embodiment the Result Server directs network traffic over its P2P client/server connections in accordance with embodiments of the inventive arrangements disclosed herein.

FIG. 5 depicts how the software gathers necessary information for continued use by collecting network addresses. Every time the software runs, it will request new network address locations (step 502). This is essential and allows the software to operate indefinitely without prompting the user for additional connection addresses. Once received, addresses are recorded into the list (step 504). The list retains the addresses even after the software has been deactivated. This is advantageous in that the next time this software is operated it will already have a list of available connections. Every time a network status response is received, the process in FIG. 5 is executed. FIG. 5 continues to execute even while the software is running. This is, however, merely the result of multi-threading and in terms of programmatic logic it can be considered to only operate at the beginning of each connection cycle FIG. 6 shows how the software replicates the behavior of its neighbor client/server applications. Since the primary function of P2P network client/server applications is packet routing, that is exactly what the software does. The software allows the data traffic of the network to flow through it so that it becomes a full-fledged node on the network, similar to the client/servers. Since this packet routing makes up the majority of the software's traffic, its neighbors see it as a valid client server sending packets onto their proper destination just like them. The software receives a network packet (step 602) and determines what direction the packet is traveling (decision 604). If the packet is outgoing, the software saves the location of the sender of the packet (step 606) and relays the packet out to all neighbors (step 608). If, however, the packet is returning, the software will look up the location of the sender of the original packet (step 610) and route the packet back to the original sender (step 612).

Figure 7:
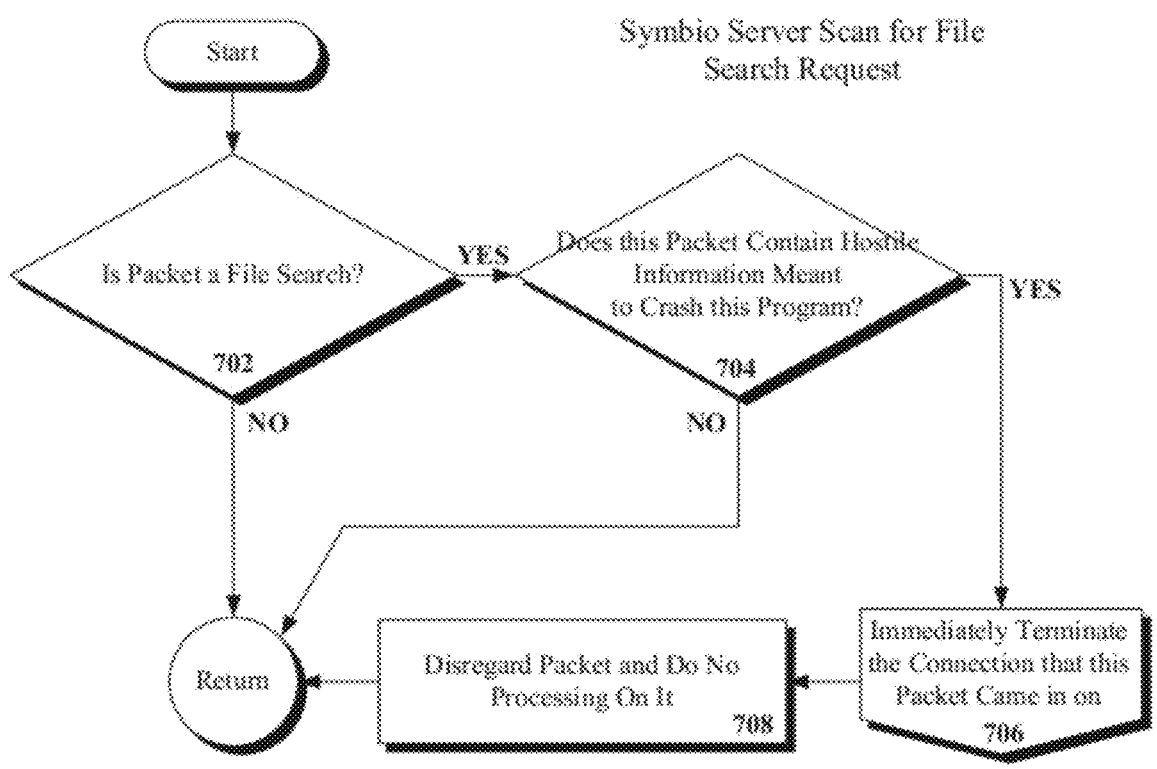
FIG. 7 is a flow chart illustrating how in one embodiment the Result Server scans incoming search requests for relevant search acronyms in accordance with embodiments of the inventive arrangements disclosed herein.

FIG. 7 depicts how the software scans the file search request by checking the packet for two things. First, the software determines if the packet is a file search (decision 702). Since the Result Server 104 is only interested in file search packets, it is unnecessary to waste time processing other packets. If the packet is not a file search, it is returned back to the main system and sent along the network like any other packet. If it is a search packet, it is analyzed for hostile data (decision 704). Hostile data is a search packet that is used to detect advertisers and spammers on P2P networks. The packet contains invalid data that only a spammer would respond to. Since this packet attracts suspicion by a nearby P2P client/server, it is best to disconnect (step 706) and drop the hostile packet (step 708), essentially destroying it. This way the Result Server 104 can now reconnect to a new node on the P2P network that is not currently suspicious of it.

Figure 8:
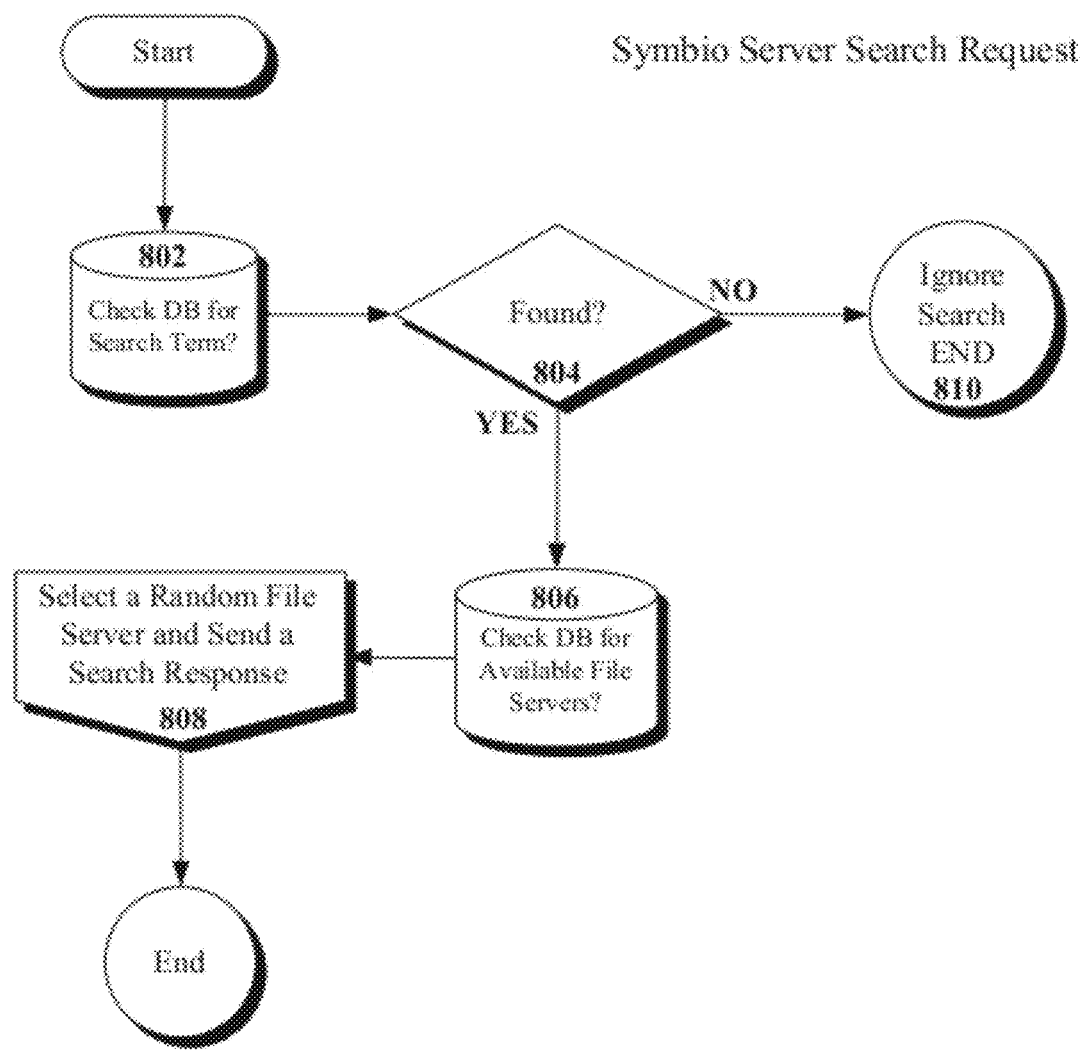
FIG. 8 depicts how in one embodiment the result server matches and responds to each search request in accordance with embodiments of the inventive arrangements disclosed herein.

FIG. 8 depicts how the Result Server 104 matches and responds to each search request. First, the incoming search term is compared against a list of keywords kept in a database (step 802). Matches are non-case sensitive and can be partial in nature. For example, if a search requests "Mad" and the database contains the keyword "Madonna," the database will return the keyword "Madonna." Also, if the search request contains more characters then a keyword in the database, the database will still return the keyword. For example, if a search requests "Metallica~" and the closest available keyword is "metal," then the database will return the keyword "metal." If there is no match (step 804), then the search will be ignored and the Result Server 104 will go back to regular functioning (step 810). If there is a match (step 804), then the Result Server 104 will check the list of available file servers that can handle this file (step 806) and then select a server at random (step 808) to allow for an even bandwidth distribution (this random distribution can be altered to prefer one server over another based on the known bandwidth of each server).

Figure 9:
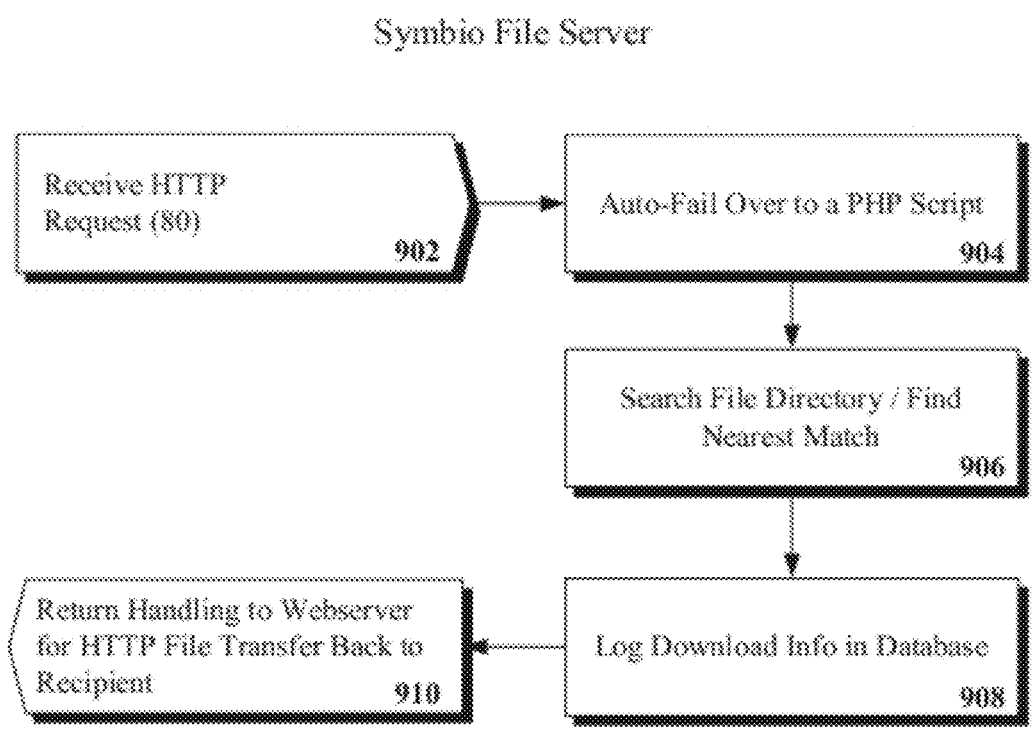
FIG. 9 shows the functionality of one embodiment of the File Server in accordance with embodiments of the inventive arrangements disclosed herein.

FIG. 9 details the basic operation of the File Server 118 and its differences from a normal web server. Once an I-HTP request is received (step 902), it is checked to see if it immediately matches the files on disk. If yes, the file is transmitted normally without any changes or further searches. If no, it goes into a fail-over PHP script (step 904) that searches the directories for the closest matching file (step 906) When searching for the closest matching file, the File Server 118 matches the files on record to the search request from left to right. For example, if the search request is "Lead Pencil's—nap time—like Metallica.mp3"™ it wifi match the file to "Lead Pencil's—nap time.mp3." The resulting transaction is logged in a local database or flat file (step 908). The handling for the file is then handed over to the web server (step 910) for a normal file download.

Figure 10:
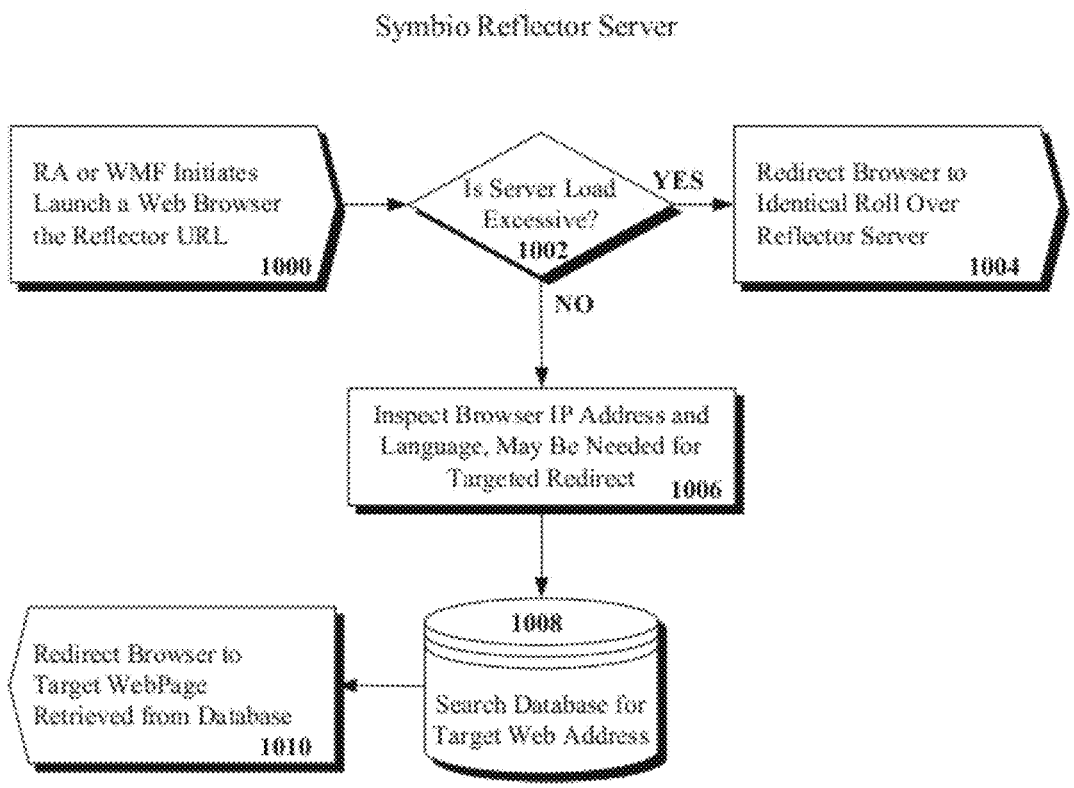
FIG. 10 is a flow chart illustrating the functionality of one embodiment of the Reflector Server in accordance with embodiments of the inventive arrangements disclosed herein.

Referring to FIG. 10 details the process by which the Reflector Server 126 is contacted and how it functions. A media file, usually an RA or a WMF (but not exclusively) is run by a user (step 1000). Upon loading the media file it preferably gives instructions to the user's computer to launch a web browser pointed at a particular website. In this embodiment, the web browser will be pointed to the Reflector Server 126. The first test by the Reflector Server 106 is for excess load (decision 1002). In other words, the server must not be so busy that it is incapable of handling the request. If the server load is already too great the user's web browser will be redirected to another server, identical in configuration to the "referring" reflector server (step 1004). If server load is within reasonable limits such that a response can be generated quickly (step 1006), then the Result Server 104 will request specialized information from the user's browser. IP Address as well as the default language of the browser is checked. This allows us to customize our advertisements to a physical region (tracked by the IP address) as well as to the user's preferred language (i.e. Spanish). Given this information, as well as a unique ID sent by the media file through the web browser, the appropriate advertisement is selected (step 1008) and the user is server-side-redirected to the actual advertisement on another web server. This entire process takes less than one second and requires no input from the user. The user will usually never see the Reflector Server, only the resulting advertisement.

The system 100 provides a scheme for using software for the utilization of P2P file sharing networks by media advertisers who wish to direct target potential customers. It uses native protocol emulation and takes advantage of the natural anonymity of such networks. It intercepts searches and responds in kind to them. The user then can then download search results at the best possible speed and efficiency and can enjoy the media, along with its associated targeted advertisements. It comprises eight primary elements including:

1. Providing connection to a given P2P file-sharing network.
2. Stealth operation to prevent hacker retaliation.
3. Intercepting and responding to search requests, through associated keywords.
4. Filtering out hostile search requests meant to ferret out Result Server or other advertisers.
5. Redirecting a download to a specialized and low cost file server, allowing us to control and segment our available bandwidth.
6. Specially formatted media containing instructions to pop-up advertisement windows.
7. A server dedicated to logging and directing advertisement windows to their most appropriate advertisements.
8. Active logging of all events at all levels.

It adds protection against hostile hackers and profiling systems. It is fully automated and makes maximum use of available bandwidth in order to get the most out of the user's advertising dollar, allowing media producers to benefit from P2P networks that are otherwise costing them billions every year.

Therefore, while there has been described what is presently considered to be the preferred embodiment, it will be understood by those skilled in the art that other modifications can be made within the spirit of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method comprising:
controlling, with a file server, a database of stored content files, wherein each of the stored content files encodes a material and contains an embedded executable code, said embedded executable code causing at least one advertisement to be presented to request issuing peers of a peer-to-peer network each time a content file of the stored content files is utilized;
configuring a result server to act as a node in the peer-to-peer network, said peer-to-peer network being organized loosely without any centralized management authority, and to follow rules and protocols of the decentralized peer-to-peer network;
probing, with the result server, peer-to-peer network traffic to discover one or more file search requests from request issuing peers, said one or more file search requests seeking material;
searching a local database of the result server for names of files satisfying a discovered file search request; and conveying, with the result server, search results to the request issuing peer, said search results satisfying the discovered file search request, wherein the request issuing peer causes transmission of a request to the file server for a content file containing sought material, wherein the file server responds to the request by sending the content file to the request issuing peer, the content file including a copy of the sought material and the embedded executable code, and wherein each time the content file received from the file server is utilized, the embedded executable code is executed and presents the request issuing peer with at least one advertisement before or during playback of the material of the received content file.

2. The method of claim 1, further comprising:

when no matching file is found, the result server passing the discovered file search request back to the peer-to-peer network for handling by other peers, wherein said result server acts as a well-behaved neighbor in the peer-to-peer network.

3. The method of claim 1, wherein the stored content files comprise copyright protected digital content, and wherein an entity providing the result server and the file server is an entity authorized to disseminate the copyright protected digital content.

4. The method of claim 3, wherein advertising occurs with the volition and cooperation of the entity.

5. The method of claim 1, wherein a plurality of entities are financially compensated by an advertising entity associated with the at least one advertisement, wherein the entities that are financially compensated comprise an entity providing the result server and the file server and an entity owning the material encoded in the content file, both of which are different entities than the advertising entity.

6. The method of claim 1, wherein when the received content file is opened by a user of the request issuing peer, at least a portion of a browser of a peer-to-peer client device being used by the user is automatically directed to a Web link of the embedded executable code.

7. A method for distributing content files in a peer-to-peer network, the method comprising the steps of:

controlling, with a file server, a database of stored content files, wherein each of the stored content files encodes a material and contains an embedded executable code, said embedded executable code causing at least one advertisement to be presented to request issuing peers of a peer-to-peer network each time a content file of the stored content files is utilized;

configuring a result server to act as a node in the peer-to-peer network, said peer-to-peer network being organized loosely without any centralized management authority, and to follow rules and protocols of the de-centralized peer-to-peer network;

receiving, with the result server, one or more file search requests from request issuing peers over the peer-to-peer network, said one or more file search requests comprising search criteria identifying sought material;

searching a local database of the result server for names of files satisfying a received file search request; and conveying, with the result server, search results to the request issuing peer, said search results satisfying the received file search request, wherein the request issuing peer causes transmission of a request to the file server for a content file containing sought material, wherein the file server responds to the request by sending the content file to the request issuing peer, the content file including a copy of the sought material and the embedded executable code, and wherein each time the content file received from the file server is utilized, the embedded executable code is executed and presents the request issuing peer with at least one advertisement before or during playback of the material of the received content file.

8. An information handling system, comprising:

a file server controlling a database of stored content files, wherein each of the stored content files encodes a material and contains an embedded executable code, said embedded executable code causing at least one advertisement to be presented to request issuing peers of a peer-to-peer network each time a content file of the stored content files is utilized; and a result server configured to act as a node in the peer-to-peer network, said peer-to-peer network being organized loosely without any centralized management authority, said result server being further configured to follow rules and protocols of the de-centralized peer-to-peer network, the result server including at least one computer processor, an input receiving component, a search engine, and a server logic that execute upon the at least one computer processor, said input receiving component configured to probe peer-to-peer network traffic to discover one or more file search requests from request issuing peers, said one or more file search requests seeking material;

said search engine configured to search a local database of the result server for names of files satisfying a discovered file search request; and said server logic configured to convey search results to the request issuing peer, said search results satisfying the discovered file search request, wherein the request issuing peer causes transmission of a request to the file server for a content file containing sought material, wherein the file server responds to the request by sending the content file to the request issuing peer, the content file including a copy of the sought material and the embedded executable code, and wherein each time the content file received from the file server is utilized, the embedded executable code is executed and presents the request issuing peer with at least one advertisement before or during playback of the material of the received content file.

9. The system of claim 8, wherein the content file served by the result server comprises a legitimate copy of a copyrighted material, wherein the legitimate copy is created with the cooperation and volition of a company holding rights to the copyrighted material.

10. The system of claim 8, wherein the content file comprises a unique identifier associated with the content file, wherein a plurality of file names have the unique identifier and are all different names for a selected file, and wherein each of said at least one advertisements is associated with the unique identifier, and wherein advertising provides a content distributor a means for deriving profit from peer-to-peer file sharing.

11. The system of claim 10, wherein a request for the at least one advertisement is transmitted to a reflector server of the information handling system responsive to a user command to run the received content file, and wherein the reflector server serves the at least one advertisement based at least in part on the unique identifier, wherein an entity associated with the at least one advertisement financially compensates a different entity that discovered the file search request and provided the content file in response, and wherein the at least one advertisement is a targeted advertisement specifically selected as being appropriate for the content file.

12. The system of claim 8, wherein the at least one advertisement is served by a reflector server, which locates an appropriate advertisement at a time that the content file is utilized, wherein advertisement content is unknown until the time the received content file is utilized.

13. The system of claim 8, wherein the received content file is a file other than the one requested by the request issuing peer, and is indicated as being similar to a requested file specified in the discovered file search request, wherein an entity providing the information handling system is financially compensated by an advertiser associated with the at least one advertisement, wherein said peer-to-peer network consists of a computer network in which members have equal rights to one another, and wherein the peer-to-peer network allows members to use each other's hard-drives equally.

14. The system of claim 8, wherein when a user of the received content file activates a player to play the content file, the request issuing peer automatically contacts an advertising server corresponding to the at least one advertisement.

15. An information handling system comprising:
  means for controlling a database of stored content files, wherein each of the stored content files encodes a material and contains an embedded executable code, said embedded executable code causing at least one advertisement to be presented to request issuing peers of a peer-to-peer network each time a content file of the stored content files is utilized; and
  a result server configured to act as a node in the peer-to-peer network, said peer-to-peer network being organized loosely without any centralized management authority, said result server being further configured to follow rules and protocols of the de-centralized peer-to-peer network, the result server including at least one computer processor, an input receiving component, a search engine, and a server logic that execute upon the at least one computer processor,
    said input receiving component configured to receive one or more file search requests from request issuing peers, said one or more file search requests comprising search criteria identifying sought material;
    said search engine configured to search a local database of the result server for names of files satisfying a received file search request; and
    said server logic configured to convey search results to the request issuing peer, said search results satisfying the received file search request,
    wherein the request issuing peer causes transmission of a request to the means for controlling the database for a content file containing sought material,
    wherein the means for controlling the database responds to the request by sending the content file to the request issuing peer, the content file including a copy of the sought material and the embedded executable code, and
    wherein each time the content file received from the means for controlling the database is utilized, the embedded executable code is executed and presents the request issuing peer with at least one advertisement before or during playback of the material of the received content file.

16. A computer system comprising:
  one or more processors, one or more computer-readable memories and one or more computer-readable storage devices;
  program instructions, stored on at least one of the one or more storage devices for execution by at least one of the one or more processors via at least one of the one or more memories, that configure a file server to control a database of stored content files, wherein each of the stored content files encodes a material and contains an embedded executable code, said embedded executable code causing at least one advertisement to be presented to request issuing peers of a peer-to-peer network each time a content file of the stored content files is utilized;
  program instructions, stored on at least one of the one or more storage devices for execution by at least one of the one or more processors via at least one of the one or more memories, that configure a result server to act as a node in the peer-to-peer network, said peer-to-peer network being organized loosely without any centralized management authority, the program instructions further to configure said result server being to follow rules and protocols of the de-centralized peer-to-peer network;
  program instructions, stored on at least one of the one or more storage devices for execution by at least one of the one or more processors via at least one of the one or more memories, that configure the result server to probe peer-to-peer network traffic to discover one or more file search requests from request issuing peers, said one or more file search requests seeking material;
  program instructions, stored on at least one of the one or more storage devices for execution by at least one of the one or more processors via at least one of the one or more memories, that configure the result server to search a local database of the result server for names of files satisfying a discovered file search request; and
  program instructions, stored on at least one of the one or more storage devices for execution by at least one of the one or more processors via at least one of the one or more memories, that configure the result server to convey search results to the request issuing peer, said search results satisfying the discovered file search request,
    wherein the request issuing peer causes transmission of a request to the file server for a content file containing sought material,
    wherein the file server responds to the request by sending the content file to the request issuing peer, the content file including a copy of the sought material and the embedded executable code, and
  wherein each time the content file received from the file server is utilized, the embedded executable code is executed and presents the request issuing peer with at least one advertisement before or during playback of the material of the received content file.

17. A computer program product for distributing content files in a peer-to-peer network, comprising:
  one or more computer-readable, non-transitory storage mediums;
  program instructions, stored on at least one of the one or more computer-readable, non-transitory storage mediums, that configure a file server to control a database of stored content files, wherein each of the stored content files encodes a material and contains an embedded executable code, said embedded executable code causing at least one advertisement to be presented to request issuing peers of a peer-to-peer network each time a content file of the stored content files is utilized;

program instructions, stored on at least one of the one or more computer-readable, non-transitory storage mediums, that configure a result server to act as a node in the peer-to-peer network, said peer-to-peer network being organized loosely without any centralized management authority, the program instructions further to configure said result server being to follow rules and protocols of the de-centralized peer-to-peer network;

program instructions, stored on at least one of the one or more computer-readable, non-transitory storage mediums, that configure the result server to probe peer-to-peer network traffic to discover one or more file search requests from request issuing peers, said one or more file search requests seeking material;

program instructions, stored on at least one of the one or more computer-readable, non-transitory storage mediums, that configure the result server to search a local database of the result server for names of files satisfying a discovered file search request; and program instructions, stored on at least one of the one or more computer-readable, non-transitory storage mediums, that configure the result server to convey search results to the request issuing peer, said search results satisfying the discovered file search request, wherein the request issuing peer causes transmission of a request to the file server for a content file containing sought material, wherein the file server responds to the request by sending the content file to the request issuing peer, the content file including a copy of the sought material and the embedded executable code, and wherein each time the content file received from the file server is utilized, the embedded executable code is executed and presents the request issuing peer with at least one advertisement before or during playback of the material of the received content file.

* * * * *